US010045550B2

(12) United States Patent
Libens et al.

(10) Patent No.: US 10,045,550 B2
(45) Date of Patent: Aug. 14, 2018

(54) ROOM-TEMPERATURE STORABLE CHEESECAKE FILLING

(75) Inventors: Jo Libens, Boutersem (BE); Michel Vanhove, Rijmenam (BE); Jean-Luc Soyeur, Ollignies (BE)

(73) Assignee: Puratos N.V., Groot-Bijgaarden (BE)

( * ) Notice: Subject to any disclaimer, the term of this patent is extended or adjusted under 35 U.S.C. 154(b) by 177 days.

(21) Appl. No.: 14/114,618

(22) PCT Filed: Apr. 27, 2012

(86) PCT No.: PCT/EP2012/057717
§ 371 (c)(1),
(2), (4) Date: Jan. 30, 2014

(87) PCT Pub. No.: WO2012/146693
PCT Pub. Date: Nov. 1, 2012

(65) Prior Publication Data
US 2014/0170285 A1 Jun. 19, 2014

(30) Foreign Application Priority Data

Apr. 29, 2011 (EP) .................................. 11164351

(51) Int. Cl.
| A23C 19/09 | (2006.01) |
| A23C 19/097 | (2006.01) |
| A23L 3/16 | (2006.01) |
| A23L 3/3436 | (2006.01) |
| A23L 3/3463 | (2006.01) |
| A21D 13/38 | (2017.01) |

(52) U.S. Cl.
CPC .......... *A23C 19/0912* (2013.01); *A21D 13/38* (2017.01); *A23C 19/0973* (2013.01); *A23L 3/16* (2013.01); *A23L 3/3436* (2013.01); *A23L 3/3463* (2013.01)

(58) Field of Classification Search
CPC ............ A23C 19/0912; A23C 19/0973; A23C 19/0904; A21D 13/0041; A23L 3/16
USPC .................................. 426/54, 541
See application file for complete search history.

(56) References Cited

U.S. PATENT DOCUMENTS

| 1,928,664 A * | 10/1933 | Gutgeld ............. A23C 19/0912 426/582 |
| 4,312,891 A * | 1/1982 | Eisfeldt .............. A23C 19/0765 426/564 |
| 4,425,369 A * | 1/1984 | Sakamoto .......... A23C 19/0912 426/564 |
| 4,427,709 A | 6/1984 | Guhl et al. |
| 4,511,589 A * | 4/1985 | Padly ................... A23B 5/0055 165/94 |
| 4,524,083 A * | 6/1985 | Liot ........................ A23B 5/00 426/298 |
| 4,732,772 A | 3/1988 | Nolte |
| 4,795,650 A | 1/1989 | Groobert |
| 6,106,884 A | 8/2000 | Rapaport |
| 2001/0018087 A1 * | 8/2001 | Coleman ............ A23C 19/0765 426/324 |

FOREIGN PATENT DOCUMENTS

| DE | 3005866 | 8/1981 |
| GB | 2032241 | 5/1980 |
| WO | 9504468 | 2/1995 |

OTHER PUBLICATIONS

International Search Report, PCT/EP2012/057717, dated Oct. 26, 2012, 6 pages.
Written Opinion, PCT/EP2012/057717, dated Oct. 26, 2012, 10 pages.
Anonymous: "Ready to Eat Cheesecake Filling", Mintel, Jun. 1, 2006, 2 pages, XP002649655.
H.G. Kessler, "Lebensmittel-und Bioyerfahrenstechnik", Jan. 1, 1996, Verlag A.Kessler, München, pp. 142-143, XP002679710.
Prof. Dr. Karl Herrmann: "Lexikon Lebensmittel and Ernährung", Jan. 1, 1989, Ceres verlag, Bielefeld, p. 430, XP002679710.

* cited by examiner

*Primary Examiner* — Jeffrey P Mornhinweg
(74) *Attorney, Agent, or Firm* — Senniger Powers LLP

(57) ABSTRACT

A method for the production of room-temperature stable cheesecake filling and the cheesecake filling obtainable by this method.

16 Claims, No Drawings

ROOM-TEMPERATURE STORABLE CHEESECAKE FILLING

REFERENCE TO RELATED APPLICATIONS

This application is the United States National Stage Application of International Application No. PCT/EP2012/057717, filed Apr. 27, 2012, and claims the benefit of European Patent Application No. 11164351.6, filed Apr. 29, 2011, the entire disclosures of which are incorporated herein by reference.

FIELD OF THE INVENTION

The present invention relates to a room-temperature storable and ready-to-bake cheesecake filling comprising eggs and cheese, and methods for its production.

BACKGROUND OF THE INVENTION AND STATE OF THE ART

Cheesecake, and especially the New York-style cheesecake, benefit from both a long established tradition and from a renewed consumer's attention, probably due to organoleptic properties with a complex taste of acid and cheese notes, combined with a unique creamy mouthfeel.

Cheesecakes are usually processed from scratch by mixing the ingredients rapidly followed by a gentle baking stage, preferably using "Bain-Marie". Baking results in the setting (jellification) of the ingredients mix.

However, the quality and/or properties of these 'homemade' cheesecakes present variations and their baking may result into cracks on the surface of the baked cheesecake in an unpredictable manner, especially in the case of too rapid heating.

In addition, the ingredients, when mixed, must be baked rapidly, or kept refrigerated, as microbiologically acceptable conditions and stability towards oxidation of the resulting product are poor.

For instance, U.S. Pat. No. 4,732,772 discloses a ready-to-use cheesecake filling mix comprising milk, cream, eggs, but no cheese. However, this mix must be stored at refrigeration temperatures or even frozen to avoid product degradation.

GB 2 032 241 discloses a ready-to-use cheesecake comprising cream cheese, sugar, water, stabilizers and optional ingredients, but no eggs. This composition is not intended for baking.

U.S. Pat. No. 6,106,884 discloses a ready-to-bake cheesecake batter, which can be stored at refrigerated temperatures. However, no eggs are present in this batter.

Philadelphia ready-to-eat cheesecake filling (XP-002649655) discloses a composition comprising cream cheese, whey proteins, sugar, stabilizers and other optional ingredients, but no eggs. This composition must be stored chilled and is not intended for baking.

DE 30 05 866 discloses an antioxidant-free ready-to-bake cheesecake filling comprising cheese having a dry mass of 29-31%, sugar, 3.97% eggs and stabilizers. However, this composition is not stable at room-temperature.

Dry mixes for cheesecake were developed. However, there is a need to further rehydrate these dry mixes before use. Moreover, these dry mixes often present a less pleasant taste.

U.S. Pat. No. 4,427,709 discloses a dry mix for a cheesecake made of spray dried cheese and of vegetable fat, but with no eggs. This mix is therefore not ready-to-bake.

Accordingly, there is still a need to develop a mix for cheesecake, possibly in the form of a ready-to use (ready-to-bake) filling that is both stable, especially at room-temperature, and that retains after baking all the organoleptic advantages of the cheesecake made from scratch.

SUMMARY OF THE INVENTION

A first aspect of the present invention is a method for the production of a (room-temperature storable) cheesecake filling comprising the steps of:
a) mixing cheese, a stabilizer, water, and preferably an anti-oxidizing agent, and submitting the obtained mixture to a heating (pasteurisation) step at a temperature comprised between 75° C. and 140° C.;
b) mixing eggs with sugar;
c) combining the cheese-containing mixture resulting from step a) with the egg-containing mixture resulting from step b) such that the temperature of the resulting mixture is maintained between 50° C. and 90° C.; and
d) optionally, cooling the mixture resulting from step c).

Preferably the mixture resulting from step c or d has the composition(s) described in Table 1.

Preferably, this method further comprises a step e) of packaging the combined mixture resulting from steps c) or d) in a light-impenetrable container and, optionally, of storing this packaged composition at room-temperature.

Preferably, in this method, the step c) is performed such that the temperature of the resulting mixture is maintained between 60° C. and 80° C., preferably between 70° C. and 80° C.

Optionally, the mixture of step a) further comprises an ingredient selected from the group consisting of a preservative, an acid, and any combinations or mixtures thereof, and/or an ingredient selected from the group consisting of an emulsifier, a further stabilizer, and any combinations or mixtures thereof.

Preferably, the stabilizer is selected from the group consisting of starch and/or modified starch, xanthan gum, cellulose, cellulose derivates, locust bean gum, alginate, carrageenan and mixtures thereof; more preferably the stabilizer is selected to be starch or modified starch.

Advantageously, the sugar is selected from the group consisting of sucrose, glucose, dextrose, fructose, lactose, galactose and any combinations thereof; preferably the sugar is selected to be sucrose.

Preferably, the step b) of mixing eggs with sugar is performed with pre-pasteurized eggs (these eggs comprising egg white, and optionally egg yolk).

Preferably, steps a) to d) and optionally e), are performed in-line.

Another aspect of the present invention is a cheesecake filling obtainable by this method as described above.

Preferably, this cheesecake filling comprises: cheese (preferably in an amount comprised between 5-60 wt %); at least one stabilizer (selected from the group consisting of starch and/or modified starch, xanthan gum, cellulose, cellulose derivates, locust bean gum, alginate, carrageenan and mixtures thereof; preferably in an amount comprised between 1-4 wt %); at least one anti-oxidizing agent (preferably in an amount comprised between 0.01-1 wt %); (pre-(pasteurized)) egg (preferably in an amount comprised between 5-30 wt %, more preferably between 11-25 wt %); sugar (i.e. added sugar (sucrose), for instance between 0 and 50 wt %).

Preferably, this cheesecake filling has a total fat content between 0.5% and 15%.

Preferably, this cheesecake filling has a Brix comprised between 30 and 60.

Advantageously, this cheesecake filling is room-temperature storable (i.e. storable at 15° C.-25° C., preferably at about 20° C.)

Advantageously, this cheesecake filling is ready-to-bake (even in conventional oven).

Advantageously, this cheesecake filling has a texture parameter comprised between 15 and 200 g, when measured with a texture analyser device (TA-TX2), and whereby this texture parameter consists in the force (g) needed to insert a probe in the form of a cylinder of 2.5 cm diameter and 3.5 cm height in a distance of one centimetre of the cheesecake filling sample at a speed of 2 mm/sec.

Another aspect of the present invention is a method for obtaining a cheesecake comprising the step of baking this cheesecake filling, preferably in a conventional oven (to reach texture parameter values typically ranging between 300 g and 800 g).

A last aspect of the present invention is the use of this cheesecake filling for food applications.

A related aspect of the present invention is the use of ((sugar-free) pasteurized) eggs for (developing) a food composition further comprising sugar and a stabilizer selected from the group consisting of starch and/or modified starch, xanthan gum, cellulose, cellulose derivates, locust bean gum, alginate, carrageenan and mixtures thereof, and preferably wherein the eggs and/or the food composition is pasteurized.

Preferably, the stabilizer is starch or modified starch.

Advantageously, this food composition is stable at room-temperature.

DETAILED DESCRIPTION OF THE INVENTION

The presence of both eggs and cheese are a cause of the unique organoleptic properties of traditional cheesecake made from scratch.

The development of a stable (including microbiologically stable) composition comprising eggs and/or cheese remains difficult, especially for compositions that are ready-to-bake.

Indeed, heat treatments, although useful for developing microbiologically-acceptable (and stable) compositions, such as compositions comprising cheese, risk to detrimentally impact the properties of the other products of the composition, such as eggs.

The inventors have nevertheless succeeded in developing room-temperature stable ready-to-use (bake) cheesecake filling that keep all the organoleptic properties of traditional cheesecake made from scratch.

The present invention relates to a method for the production of (a room-temperature storable) egg-containing (ready-to-use) liquid composition (mix) comprising the steps of:

mixing (non sucrose supplemented) (pre-pasteurized) eggs with sugar;

mixing the obtained mixture to a (pasteurized) aqueous solution comprising at least one stabilizer such as to obtain a liquid composition, the temperature of said liquid composition being maintained between 50° C. and 90° C.; and optionally cooling the obtained liquid composition.

Preferably, the resulting composition is then (aseptically and/or ultra-cleanly) packaged in a (light-impermeable) container and, optionally, stored at room-temperature.

The method of the invention is especially useful for the production of a complete (ready-to-use) cheesecake filling.

Therefore, in a related aspect, the present invention is directed to a method for the production of a (room-temperature storable) (ready-to-use) cheesecake filling comprising the steps of:

a) mixing cheese, a stabilizer, water and an anti-oxidizing agent and submitting the obtained mixture to a pasteurisation step;

b) mixing (pasteurized) eggs with sugar;

c) combining this cheese-containing mixture (resulting from step a)) and this egg-containing mixture (resulting from step b)), such that the temperature of the resulting mixture is maintained between 50° C. and 90° C. (preferably, between 60° C. and 80° C., more preferably between 70° C. and 80° C.); and d) optionally, cooling this combined mixture (resulting from step c)).

Preferably, this method for the production of a room-temperature storable (ready-to-use) cheesecake filling further comprises a step e) of (aseptically and/or ultra-cleanly) packaging the combined mixture of step c) or d) in a (light-impenetrable) container and, optionally, of storing the said packaged composition at room-temperature.

Preferably, in this method for the production of a room-temperature (i.e. from 15° C. to 25° C., preferably at about 20° C.) storable (ready-to-use) cheesecake filling, the mixture of step a) further comprises at least one emulsifier.

Possible emulsifiers are sucrose esters, mono and diglycerides, Datem (Diacetyl Tartaric Acid Ester of Mono- and Diglycerides), SSL (sodium stearoyl lactylate), CSL (calcium stearoyl lactylate), polysorbates, and mixtures thereof.

Advantageously, the stabilizer comprises starch and/or modified starch, xanthan gum, cellulose, cellulose derivates, locust bean gum, alginate, carrageenan and mixtures thereof.

Preferred stabilizer is starch or modified starch.

Preferably, the stabilizer comprises starch and/or modified starch, in addition to at least another stabilizer.

Preferably, in these methods the sugar is selected from the group consisting of sucrose, glucose, dextrose, fructose, lactose and galactose, being more preferably (essentially) sucrose.

Preferably, in these methods, the recipient for packaging is light-impenetrable.

Preferably, these methods are performed in-line (continuously), for example by continuous volumetric dosing.

Preferably, in these methods, the aqueous solution (preferably comprising cheese) is firstly heat-treated between 1 second and 20 minutes at a temperature between 75° C. and 140° C., then cooled at a temperature between 50° C. and 90° C. (before mixing with the egg-containing mixture).

Possibly, in these methods, the aqueous solution (preferably comprising cheese) is firstly pasteurised upon heating between 1 minute and 20 minutes at a temperature between 75° C. and 100° C., then cooled at a temperature between 50° C. and 90° C. (before mixing with the egg-containing mixture).

Alternatively, in these methods, the water solution (preferably comprising cheese) is firstly pasteurised upon a UHT treatment by heating between 1 second and 1 minute at a temperature between 100° C. and 140° C., then cooled at a temperature between 50° C. and 90° C. (before mixing with the egg-containing mixture).

Preferably, the cooling step of these methods (step d) is performed between 0.5 minutes and 5 minutes.

Advantageously, in these methods, the (pasteurised) eggs are mixed with sugar (sucrose) in a weight ratio ranging between 4:1 and 1:2 and preferably in a weight ratio between 3:1 and 1:1.

Advantageously, in these methods, the (pasteurized) eggs are selected from the group consisting of (pasteurised) whole egg, (pasteurised) egg yolk and (pasteurised) egg white or a mixture thereof.

Possibly, in these methods, the weight ratio of egg white and egg yolk, is comprised between 2:1 and 8:1, preferably between 3:1 and 7:1, more preferably between 4:1 and 6:1.

Preferably, in these methods, the (pasteurised) eggs were (previously) pasteurised without the addition of sugar (sucrose).

Most preferably, in these methods, the proteins of these (sugar-free) pasteurised eggs are not denaturated and/or not coagulated, yet the pasteurization is sufficient to allow a (room-temperature) stable and/or storable resulting composition.

Many types of cheese may be used for the present invention. For instance, cheese may be fresh or in powder, preferably fresh.

Preferably, the cheese used in the present method for the production of a cheesecake filling contains from 40 to 70% of water and/or from 10 to 40% of fat.

Most preferably, cheese are selected from the group consisting of cream cheese, ricotta, mascarpone, "fromage frais", "kwark". Still more preferably the cheese is cream cheese.

Another aspect of the present invention is directed to the product(s) (preferably in the form of a cheesecake filling) obtainable by this (these) method(s).

A further aspect of the present invention is directed to a cheesecake filling comprising:
- Cheese in an amount comprised between 1-70 wt %;
- at least one stabilizer in an amount comprised between 1-10 wt %;
- at least one anti-oxidizing agent in an amount comprised between 0.01-1 wt %;
- ((pre-)pasteurized) egg in an amount comprised between 5-30 wt %;
- sugar (i.e. added sugar (sucrose), for instance between 5 and 40 wt %).

Preferably, the present invention is directed to a cheesecake filling comprising:
- Cheese in an amount comprised between 5-60 wt %;
- at least one stabilizer in an amount comprised between 1-4 wt %;
- at least one anti-oxidizing agent in an amount comprised between 0.01-1 wt %;
- ((pre-)pasteurized) egg in an amount comprised between 10-25 wt %;
- sugar (added sugar (sucrose), for instance between 5 and 30 wt %).

More preferably, the present invention is directed to a cheesecake filling comprising:
- Cheese in an amount comprised between 10-40 wt %;
- at least one stabilizer in an amount comprised between 1-4 wt %;
- at least one anti-oxidizing agent in an amount comprised between 0.01-1 wt %;
- ((pre-)pasteurized) egg in an amount comprised between 10-20 wt %;
- sugar (i.e. added sugar (sucrose), for instance between 5 and 15 wt %).

Preferably, this cheesecake filling is present in a light-impenetrable recipient.

Advantageously, the present invention relates to a product for bakery industry comprising a light-impenetrable container in which is packaged the cheesecake filling according to the present invention.

Advantageously, this cheesecake filling further comprises one acid such as lactic acid and/or citric acid and possibly a preservative such as potassium sorbate.

The cheesecake filling may also contain an emulsifier.

Possible emulsifiers are sucrose esters, mono and diglycerides, Datem (Diacetyl Tartaric Acid Ester of Mono- and Diglycerides), SSL (sodium stearoyl lactylate), CSL (calcium stearoyl lactylate), polysorbates, and mixtures thereof.

Preferably, this cheesecake filling has a Brix comprised between 30 and 60.

Brix in the context of the present invention (preferably) refers to the percentage of the soluble dry matter in water (and/or in a liquid).

Preferably, in this cheesecake filling, the (added) sugar is selected from the group consisting of sucrose, glucose, dextrose, fructose, lactose and galactose, being more preferably (essentially) sucrose.

Preferably, this cheesecake filling has a pH between 3 and 7.

Possibly, this cheesecake filling, especially for cheesecake fillings being at a pH higher than 4.8, has a reduced water activity (aW).

Preferably, this cheesecake filling has a total protein content comprised between 1% and 20% (w:w), more preferably, between 5% and 10% (w:w).

Preferably, this cheesecake filling has a total fat content comprised between 0.5% and 30% (w:w), more preferably between 3 and 15% (w:w).

Preferably, the protein and fat of this cheesecake filling originate almost exclusively (such as more than 90 weight %) from the eggs and from the cheese.

Preferably, the cheese of the present cheesecake filling contains from 40 to 70% (w:w) of water and/or between about 10% (w:w) and about 40% (w:w), of fat.

Most preferably, cheese are selected from the group consisting of cream cheese, ricotta, mascarpone, "fromage frais", "kwark". Still more preferably the cheese is cream cheese.

Advantageously, the stabilizer comprises starch and/or modified starch, xanthan gum, cellulose, cellulose derivates, locust bean gum, alginate, carrageenan and mixtures thereof.

Preferably, the at least one stabilizer of this cheesecake filling comprises starch or modified starch, in addition to at least another stabilizer.

Advantageously, this cheesecake filling comprises (pasteurised) eggs in a weight ratio ranging between 5% and 30% and preferably in a weight ratio between 10% and 20%.

Preferably, the eggs present (used) in the cheesecake filling of the invention are (pre-)pasteurized.

More preferably (or, in addition), the pasteurisation step of these eggs is performed on eggs that were not mixed with sugar (referred as to non sucrose supplemented eggs).

Advantageously, these (pasteurized) eggs are selected from the group consisting of (pasteurised) whole eggs, (pasteurised) egg yolk and (pasteurised) egg white or a mixture thereof.

Possibly, in the cheesecake filling of the invention, the weight ratio of egg white and egg yolk is comprised between 2:1 and 8:1, preferably between 3:1 and 7:1, more preferably between 4:1 and 6:1.

More preferably, these (sugar-free) pasteurised eggs (present in the cheesecake filling of the present invention and/or in the food composition of the present invention) are not heat-denaturated and/or the egg protein(s) (mainly) retain their native conformation and/or the egg proteins are not coagulated, yet the pasteurization is sufficient to allow a (room-temperature) stable and/or storable resulting (food) composition.

Preferably, the cheesecake filling of the invention is present (stored) in a light-impenetrable container.

Preferably, the cheesecake filling of the invention has a texture (parameter) comprised between 15 g and 200 g, preferably between 50 g and 120 g.

In the context of the present invention, this texture parameter consists in the force (g) needed to insert a probe in the form of a cylinder of 2.5 cm diameter and 3.5 cm height in a distance of one centimetre of the cheesecake filling (sample) at a speed of 2 mm/sec.

Advantageously, this texture parameter may be measured by a texture analyser device, such as an analyser TA-XT2™ with a S2 probe in the conditions as described above (Stable Micro Systems Ltd, UK).

Advantageously, the cheesecake filling of the invention, (aseptically) packaged in a light-impenetrable container, is stable upon prolonged storage at room temperature, for at least 1, 2, 3, 4, 5, 6 months and even up to 9 months.

In the context of the present invention, the term "stable" associated with the cheesecake filling of the invention, is intended to reflect that the cheesecake filling is substantially unchanged in terms of aspect, texture, taste, and composition and is substantially microbiologically unchanged.

Preferably, in the present invention (method and/or mixture) the term "filling" points to a ready-to use (and thus to bake) mixture that can be baked without additional ingredients to form a cheesecake.

The filling of the present invention may be further combined before baking with other (non-structural) ingredients such as aroma, chocolate, fruit(s) and other fillings.

The ready-to-use filling of the present invention may optionally be combined before baking with other additional ingredients such as extra eggs or eggs fractions, milk or other dairy components, fats such as margarine, and mixtures thereof.

Advantageously, the quality of this cheesecake filling is constant and even allows for a direct baking of this filling (and/or of the cheesecake comprising this filling) in a conventional oven, and reproductively results into a cheesecake with no defects such as cracks.

For example the filling of the invention may be directly poured on top of a biscuit base in a suitable mold and baked in a oven at about 145° C. and 200° C. for about 40 to 70 minutes.

Therefore, a further aspect of the present invention is a process to obtain a cheesecake comprising the step of baking this cheesecake filling in a conventional oven.

Advantageously, after baking (in a conventional oven or using "Bain-Marie"), the texture of the cheesecake is between 150 and 1500 g, preferably between 300 and 800 g.

The cheesecake filling according to the present invention was used to prepare various cheesecakes such as New-York style cheese cake, tarta de queso, tarte au fromage blanc, . . . . All cheese cakes presented a uniform surface without cracks and were positively appreciated by consumer's panels.

EXAMPLES

Example 1

Preferred compositions of the cheesecake filling (and of the method for the production of this cheesecake filling) of the present invention are provided in Table 1.

TABLE 1

| w:w % in end cheesecake filling product | Typical ranges | Preferred ranges | Most preferred ranges |
| --- | --- | --- | --- |
| Cheese | 1-70% | 5-60% | 10-40% |
| Stabilizer | 1-10% | 1-4% | 1-4% |
| Antioxidant | 0.01-1% | 0.01-1% | 0.01-1% |
| Acid | 0-3% | 0-1% | 0-1% |
| Preservative | 0-3% | 0-1% | 0-1% |
| Emulsifier | 0-2% | 0-1% | 0-1% |
| Sugar | 0-60% | 0-50% | 5-40% |
| Water | qs | qs | qs |
| Egg yolk* | 1-15% | 1-5% | 1-5% |
| Egg white* | 5-30% | 10-20% | 10-20% |

*Egg white and yolk may be added separately and/or as whole eggs.

Example 2

Typical Procedure for the Preparation of a Cheesecake Filling According to the Invention Pasteurised (non sucrose supplemented) eggs are mixed at room-temperature with sucrose.

Water is mixed with cream cheese, emulsifiers, stabilizers and anti-oxidizing agents at 60° C. and then pasteurised at a temperature (comprised between 92° C. and 95° C.

More precisely, this mix has the composition described in Table 1 with about 30% of cream cheese, water, sucrose, glucose syrup, modified starch, cellulose derivatives, lactic acid, preservative, stabilizers and anti-oxidizing agents.

This pasteurisation step of the cream cheese mixture is performed at 92-95° C., in order to allow a rapid and pronounced decrease of microorganisms possibly present in the cream cheese.

This pasteurised mixture comprising cheese and water is then cooled at a temperature of about 80° C.

The egg- and sucrose-containing mixture are then combined with the cream cheese-containing mixtures (in a weight ratio of about 23%:about 77%) in order to obtain a liquid composition (a mix for a cheesecake filling) that is firstly cooled at 65° C.

This mix for cheesecake filling at 65° C. is aseptically packaged in a light-impenetrable recipient and subsequently kept at room-temperature.

The stability of the obtained cheesecake filling towards oxidation (rancidity) is excellent, even upon prolonged storage at room-temperature, up to 6 months of storage.

There is no detrimental pathogen concentrations in the obtained cheesecake filling, even after several months of storage at room-temperature.

The cheesecake filling of the invention allows an advantageous flexibility for use in food industry. Furthermore, the quality of several batches was constant.

Example 3

The process of example 1 is furthermore adapted to be run continuously.

In this continuous system, the composition comprising mixed water, cream cheese, stabilizers, antioxidants is heated at 92-95° C. for about 2 minutes by pumping into a tubular heat exchanger and then cooled down to 80° C. by passing through a second segment of this heat exchanger. Typical examples of suitable heat exchangers for use herein are e.g. Scrapped Surface Heat Exchangers such as those commercially available from SPX®.

The eggs mixed with sugar are added via a T-(or Y-) type junction and the combined composition passes through a third segment maintained at about 65° C.

The combined composition is then (aseptically) packaged. When run continuously, the quality of the resulting cheesecake is more constant.

Example 4

"Tarta de queso" (Spanish style cheesecake) were either prepared and baked using the filling according to the present invention or either made from a commercially available powder mix. These cheesecakes were presented to a Spanish consumer's panel of about 1000 persons. 89% of the panel has expressed his preference for the cheesecake of the invention in the form of a tarta queso by comparison to the commercially-available reference tarta queso.

The invention claimed is:

1. A method for the production of a stable, room-temperature storable, ready-to-bake cheesecake filling comprising:
   a) mixing cheese, a stabilizer, and water and heating the obtained mixture at a temperature between 75° C. and 140° C., thereby obtaining a cheese-containing mixture;
   b) mixing pre-pasteurized eggs in a weight ratio of between 5% and 30% of said cheesecake filling with sugar, thereby obtaining an egg-containing mixture;
   c) combining the cheese-containing mixture resulting from step a) with the egg-containing mixture resulting from step b) and maintaining the temperature of the resulting mixture between 50° C. and 90° C.; and
   d) optionally, cooling the mixture resulting from step c), wherein
   the pre-pasteurized eggs in step b) are non-sucrose supplemented pre-pasteurized eggs;
   during storage at room temperature in an aseptic and light impenetrable container for a period of time of at least 1 month and up to 6 months, the cheesecake filling is substantially unchanged in terms of aspect, texture, taste and composition and is substantially microbiologically unchanged; and
   the composition of the cheesecake filling is such that when the cheesecake filling is baked, a cheesecake is obtained.

2. The method according to claim 1, wherein the mixture of step a) further comprises an anti-oxidizing agent.

3. The method according to claim 2, further comprising a step e) of packaging the combined mixture resulting from steps c) or d) in a light-impenetrable container and, optionally, storing the said packaged composition at room-temperature.

4. The method according to claim 1, wherein step c) is performed such that the temperature of the resulting mixture is maintained between 60° C. and 80° C.

5. The method according to claim 1, wherein the mixture of step a) further comprises an ingredient selected from the group consisting of a preservative, an acid, an emulsifier, a further stabilizer, and any combinations or mixtures thereof.

6. The method according to claim 1, wherein the stabilizer is selected from the group consisting of starch and/or modified starch, xanthan gum, cellulose, cellulose derivatives, locust bean gum, alginate, carrageenan and mixtures thereof.

7. The method according to claim 1, wherein the sugar is selected from the group consisting of sucrose, glucose, dextrose, fructose, lactose, galactose and any combinations thereof.

8. The method according to claim 1, wherein the eggs comprise egg white.

9. The method according to claim 3, wherein steps a) to c) and optionally d) and e), are performed in-line.

10. A stable, room-temperature storable, ready-to-bake cheesecake filling comprising cheese, eggs, sugar, an anti-oxidizing agent and a stabilizer selected from the group consisting of starch and/or modified starch, xanthan gum, cellulose, cellulose derivatives, locust bean gum, alginate, carrageenan and mixtures thereof, wherein said cheesecake filling comprises eggs in a weight ratio of between 5% and 30%, the eggs are sugar-free pre-pasteurized eggs and wherein, during storage at room temperature in an aseptic and light impenetrable container for a period of time of at least 1 month and up to 6 months, the cheesecake filling is substantially unchanged in terms of aspect, texture, taste and composition and is substantially microbiologically unchanged and the composition of the cheesecake filling is such that when the cheesecake filling is baked, a cheesecake is obtained.

11. The cheesecake filling according to claim 10 having a Brix between 30 and 60.

12. The cheesecake filling according to claim 10 having a total fat content between 0.5% and 15%.

13. The cheesecake filling according to claim 10 having a texture parameter between 15 and 200 g, when measured with a texture analyzer device, and whereby said texture parameter consists in the force (g) needed to insert a probe in the form of a cylinder of 2.5 cm diameter and 3.5 cm height in a distance of one centimeter of the cheesecake filling sample at a speed of 2 mm/sec.

14. The cheesecake filling according to claim 10 prepared by a method comprising:
   a) mixing cheese, a stabilizer, and water and heating the obtained mixture at a temperature between 75° C. and 140° C., thereby obtaining a cheese-containing mixture;
   b) mixing sugar-free pre-pasteurized eggs in a weight ratio of between 5% and 30% of said cheesecake filling with sugar, thereby obtaining an egg-containing mixture;
   c) combining the cheese-containing mixture resulting from step a) with the egg-containing mixture resulting from step b) and maintaining the temperature of the resulting mixture between 50° C. and 90° C.; and
   d) optionally, cooling the mixture resulting from step c).

15. The cheesecake filling according to claim 10 packaged in a light-impenetrable container.

16. A method for preparing a cheesecake comprising the step of baking the cheesecake filling of claim 10.

* * * * *